United States Patent Office 2,980,562
Patented Apr. 18, 1961

2,980,562

METHOD OF SOLDERING AND FLUX THEREFOR

Robert C. Matter and Ira T. Landon, Anderson, Ind., assignors to General Motors Corporation, Detroit, Mich., a corporation of Delaware No Drawing. Filed Aug. 12, 1957, Ser. No. 677,803

11 Claims. (Cl. 148—23)

This invention relates to soldering fluxes and methods of soldering and particularly to flux compositions especially suitable for soft soldering wherein the parts to be joined are lead and lead alloys.

When soldering lead parts, or casting a lead part upon another, for effecting a strong joint therebetween, it is highly advantageous to join the parts without the introduction of a strata of extraneous material which tends to partially isolate the parts and produce an imperfect joint. This is especially true when the parts to be joined are to carry electrical currents and wherein substantially complete continuity of metal from one part to the other is highly desirable.

The majority of soldering fluxes heretofore known, while suitably fluxing the surfaces to be joined whereby at least portions of the surfaces are cleaned and prepared for the soldering operation, leave a residue between the parts to be joined wherein an imperfect joint is formed. These points of noncontinuity reduce the electrical conductivity of the joined parts and also reduce the strength of the joint in direct proportion to the quantity of extraneous material present.

Hydrazine fluxes such as hydrozine monohydrochloride and hydrazine monohydrobromide have been used quite successfully as a means for joining metal parts. The hydrazine fluxes in water solutions decompose upon attaining soldering temperatures and clean the surfaces as well as substantially disappearing therefrom to provide highly desirable soldered joints. Water solutions of hydrazine fluxes, however, are difficult to maintain in place and likewise tend to boil and splatter when the heat is applied adjacent the flux which causes nonuniformity of fluxing action and, in some cases, disrupts the continuous joints. Other means heretofore proposed for use as binders for the flux decompose and leave an undesirable residue.

The present invention is directed to hydrazine type fluxes which have all the advantages of the usual hydrazine flux and which are capable of being applied to the parts to be joined and held or bound thereto tenaciously in any desired position until the actual soldering temperature is reached whereupon the flux together with its carrier, or binder, substantially disappears at relatively low temperatures and thereby permits a substantially uniform and perfect junction to be formed.

This condition is accomplished by utilizing an alcohol carrier for the hydrazine flux together with a material which will sublime or disappear at a relatively low soldering temperature within the same temperature range as the flux disappears and which will be substantially solid at room temperature and will hold the hydrazine in place. The material referred to in this instance is a polyamide such as is sold under the tradename of Nylon. It is apparent that the specific polyamide used must be an alcohol soluble polyamide since the fluid carrier for the flux is preferably alcohol which will quickly evaporate to leave the flux in place on the portion to be soldered.

It is, therefore, the main object of the invention to provide a soldering flux of the hydrazine type which includes an alcohol soluble polyamide incorporated therewith that will maintain the hydrazine in position prior to the soldering operation, and which leaves no corrosive residue.

In carrying out this object, it is a further object to provide a composition of matter comprising an alcohol carrier, in which is incorporated at least one of the salts taken from the class consisting of hydrazine monohydrochloride and hydrazine monohydrobromide together with an alcohol soluble polyamide.

Another object of the invention is to provide a method for soldering wherein a fluid hydrazine flux is used which includes an alcohol carrier together with an alcohol soluble polyamide therein whereby the flux may be painted on the parts to be soldered, the alcohol evaporated to provide a continuous covering over the surface to be soldered which includes the hydrazine maintained tenaciously in place by the Nylon and then to carry out the soldering operation for joining the parts and simultaneously to cause substantially complete evaporation of the hydrazine and the alcohol soluble polyamide whereby a strong continuous soldered joint is obtained.

Further objects and advantages of the present invention will be apparent from the description which follows.

Hydrazine fluxes are clearly disclosed in Patent 2,612,460 wherein a water solution of the hydrazine flux is set forth which may be used in soft soldering operations. This flux is painted on the surfaces to be joined and may have incorporated therewith alcohol, waxes or petroleum jelly. It is apparent that the waxes and petroleum jelly upon decomposition will leave a residue of amorphous carbon which will be present at the joined surfaces and will produce an imperfect joint as well as lowering both the strength and electrical conductivity of the joint.

The present invention is directed to a specific type of hydrazine flux which may be used without leaving a residue of extraneous materials and which is particularly useful in connection with the soldering or burning of lead. This lead burning operation is disclosed in copending application S.N. 677,652, now U.S. Patent No. 2,942,059, filed concurrently herewith wherein lead parts of storage batteries are cast and simultaneously burned to other precast parts through the use of the flux and wherein a high strength of joint is necessary together with good electrical conductivity. It is to be understood that the lead used may be pure lead or a lead alloy, for example, a lead-antimony alloy including from 7 to 12½% antimony, or a lead-antimony-tin-arsenic alloy containing antimony in the range of from 4½ to 10%, tin about ¼ to 2% and arsenic from ¼ to 2½% with the remainder being lead. These and other lead alloys may be suitably joined by means of the flux disclosed herein.

Specifically, the flux has as its major component hydrazine monohydrobromide although hydrazine monohydrochloride may be used as well as mixtures of the two. This hydrazine component is carried by an alcohol solvent, for example, methyl, ethyl or isopropyl alcohol or combinations thereof in aqueous solution. For the most part, we prefer to use either ethyl or isopropyl alcohol as the alcohol component wherein 75 to 90% alcohol is used with the remainder being water. To this solution is added an alcohol soluble polyamide preferably in about equal quantities by weight to the hydrazine used although this may range from 1 to 2½ parts of the hydrazine used by weight. This flux is fluid and may be painted on the lead surface to be burned whereupon the alcohol evaporates leaving the hydrazine residue intermixed with the polyamide which holds the hydrazine in place on the part to be burned. When the lead burning operation proceeds, the heat applied causes the temperature to rise to a point where the polyamide sublimes and the hydrazine evaporates to substantially disappear whereby a highly desirable joint is produced without extraneous materials being present at the interface.

Alcohol soluble polyamides are well known and differ from usual Nylon type polyamides in that they are modified so that the polyamide which is normally alcohol insoluble becomes alcohol soluble. A rather complete discourse on alcohol soluble polyamides may be found in Patents 2,441,057, 2,430,860 and 2,443,486 among others, it being understood that polyamides that are alcohol soluble are readily available and well known. The following examples directed to the preparation of alcohol soluble polyamides are illustrative.

EXAMPLE I

A mixture of 100 parts fiber-forming polyhexamethylene adipamide of 40 mesh screenings, 110 parts of paraformaldehyde, and 300 parts of pyridine were placed in a pressure bomb of such size that the tube was filled to half its capacity. The tube was sealed and heated during the course of about 30 minutes to a temperature of 130° C. under the pressure developed in the tube. The heating was then continued an additional 30 minutes at 130°–140° C. Throughout the heating period the tube was shaken. The reaction vessel was then cooled and opened, and the product, a clear, thin syrup, was diluted with ethanol and poured into water. This caused the N-methylol polyhexamethylene adipamide (N-methylol polyamide) to separate as a soft precipitate. The precipitate was redissolved in ethanol and reprecipitated in water. After being dried the resultant precipitate was found to have a methylol content of 13.8% which corresponds to 61% substitution of the original amide groups in the polyamide.

The product was a soft rubbery material which was very soluble in aqueous alcohols such as methyl, ethyl and isopropyl alcohols in aqueous solution containing not more than 40 parts of water per 100 parts of solution.

EXAMPLE II

A mixture of 100 parts of polyhexamethylene adipamide having an intrinsic viscosity of 1.0 of 40 mesh screenings, 100 parts paraformaldehyde, 300 parts chloroform, and 1 part of anhydrous sodium carbonate were mixed in a pressure bomb, which was sealed and heated to 130° C. and maintained between 130° and 135° for 30 minutes. The product of the reaction was a soft paste which readily dissolved in ethanol and was isolated in the manner of Example I. The methylol polyamide contained 10.5% formaldehyde present as methylol which corresponds to 44% substitution of the original amide groups. It exhibited properties similar to those described in Example I.

EXAMPLE III

One hundred parts of polyhexamethylene adipamide of 40 mesh screenings, 125 parts of paraformaldehyde, 300 parts pyridine, and 24 parts of water were reacted in a pressure vessel in the same manner as in Example I. The reaction product was isolated in the same manner. It was found to contain 10.3% methylol, which corresponds to 43% substitution of the original amide groups. The product was similar in properties to the N-methylol polyamide described in Example I.

EXAMPLE IV

A solution of 30 parts of a fiber-forming interpolymer derived from hexamethylenediammonium adipate (30 parts) and hexamethylenediammonium sebacate (70 parts), (intrinsic viscosity about 0.8) in 120 parts of formic acid (specific gravity=1.20) was prepared at 70°–80° C. To this solution was added a mixture of 20 parts paraformaldehyde and 112 parts methyl hydroxyacetate and the mixture heated at about 75° C. for 30 minutes. This solution was poured into aqueous sodium hydroxide and the N-carbomethoxymethoxymethyl polyamide separated as a white fibrous solid. This product was readily soluble in aqueous alcohol.

The present flux is especially desirable in lead burning operations since there is no flux remaining at the "weld" upon the completion of the operation which strengthens the joint and which obviates the necessity of washing or cleaning away extraneous materials which is neither practical nor possible while producing a strong continuous bond which may be produced by pouring or casting or through normal soldering procedures.

Some specific examples of suitable fluxes are as follows wherein all proportions are expressed by weight.

Example 1

| | Parts |
|---|---|
| Isopropyl alcohol (80% alcohol-20% water) | 8 |
| Hydrazine monohydrobromide | 1 |
| Alcohol soluble polyamide | 1 |

Example 2

| | |
|---|---|
| Alcohol (95% ethyl-5% methyl-90% solution in water) | 7 |
| Hydrazine monohydrobromide | 1 |
| Alcohol soluble polyamide | 2 |

Example 3

| | |
|---|---|
| Isopropyl alcohol (90% alcohol-10% water) | 6½ |
| Hydrazine monohydrochloride and hydrazine monohydrobromide (ratio 1 to 1) | 1 |
| Alcohol soluble polyamide | 2½ |

Example 4

| | |
|---|---|
| Ethyl alcohol (90% alcohol-10% water) | 7½ |
| Hydrazine monohydrochloride | 1 |
| Alcohol soluble polyamide | 1½ |

Example 5

| | |
|---|---|
| Isopropyl alcohol (80% alcohol-20% water) | 8 |
| Hydrazine monohydrobromide and hydrazine monohydrochloride (ratio 6 to 4) | 1 |
| Alcohol soluble polyamide | 1 |

These are but a few examples of specific fluxes which may be used in soldering or lead burning operations. It is also apparent that these same fluxes can be used in soft soldering operations involving other metals although they are particularly applicable to operations on lead and lead alloys in view of the specific limitations necessary in the flux as expressed herein.

While lead-antimony alloys hereinbefore disclosed are generally used in lead burning operations, it is apparent that soft solders, for example, alloys of lead with tin wherein the lead makes up from 25% to 75% by weight with tin the remainder, may be used for general soldering operations, etc., involving the joining of bronze, brass, iron and its alloys and that the flux disclosed, while particularly adapted for lead burning operations, is equally useful in any of the usual soldering operations.

In general, the weight of polyamide used is from one to two and one-half times the weight of hydrazine used. The alcohol in all cases must be sufficient in strength and quantity to dissolve these ingredients.

While the embodiments of the present invention as herein disclosed constitute preferred forms, it is to be understood that other forms might be adopted.

What is claimed is as follows:

1. A composition of matter suitable for use as a soldering flux consisting essentially of, a component consisting of a carrier containing at least one salt selected from the group consisting of hydrazine monohydrobromide and hydrazine monohydrochloride together with an alcohol soluble Nylon-type polyamide and alcohol wherein said polyamide is present in quantities by weight of from one to two and a half times the quantity of the salt.

2. The composition matter claimed in claim 1 wherein the salt is hydrazine monohydrobromide.

3. The composition matter claimed in claim 1 wherein the salt is hydrazine monohydrochloride.

4. The composition matter claimed in claim 1 wherein the carrier is a water solution of a monohydric alcohol containing not more than three carbon atoms.

5. A composition of matter suitable for use as a soldering flux for lead and its alloys, consisting essentially of; at least one salt taken from the class consisting of hydrazine monohydrobromide and hydrazine monohydrochloride, an alcohol soluble Nylon-type polyamide in quantities of from about 1 to 2½ times by weight of the quantity of the salt used together with an aqueous solution of a monohydric alcohol containing not more than three carbon atoms.

6. The flux claimed in claim 5 wherein the salt is hydrazine monohydrobromide.

7. The flux claimed in claim 5 wherein the salt is hydrazine monohydrochloride.

8. A composition of matter suitable for use as a soldering flux for lead and its alloys consisting essentially of hydrazine monohydrobromide 1 part, and an alcohol soluble Nylon-type polyamide 1 to 2½ parts, said ingredients being carried in an aqueous solution of isopropyl alcohol.

9. A composition of matter suitable for use as a soldering flux for lead and its alloys consisting essentially of, hydrazine monohydrobromide 1 part and an alcohol soluble Nylon-type polyamide 1 to 2½ parts, said ingredients being carried in a solution comprising ethyl alcohol in water.

10. A composition of matter suitable for use as a soldering flux for lead and its alloys consisting essentially of hydrazine monohydrobromide 1 part, alcohol soluble Nylon-type polyamide 1 to 2½ parts with the remainder comprising an aqueous solution of one or more of the alcohols in the group consisting of monohydric alcohols having one to three carbon atoms.

11. In a method for soft soldering two metal parts together at juxtaposed surfaces, the steps of; applying to the surface of at least one of the parts the flux composition defined in claim 1, evaporating the alcohol therefrom for maintaining the hydrazine salt in position on the part to which it is applied by means of the polyamide binder, providing soft solder at the junction, heating the parts and the solder above the melting point of the solder for causing the solder to melt and to flow over the flux surface and simultaneously sublime the flux composition from between the metals to be joined whereby a clean soldered junction is provided.

References Cited in the file of this patent

UNITED STATES PATENTS

| | | |
|---|---|---|
| 2,214,648 | Albertson | Sept. 10, 1940 |
| 2,332,330 | McMahan | Oct. 19, 1943 |
| 2,612,459 | Willard et al. | Sept. 30, 1952 |
| 2,612,460 | Willard | Sept. 30, 1952 |